July 22, 1969 J. SELMER 3,457,357
SOUND AMPLIFICATION DEVICE FOR WIND INSTRUMENTS
Filed Oct. 22, 1965
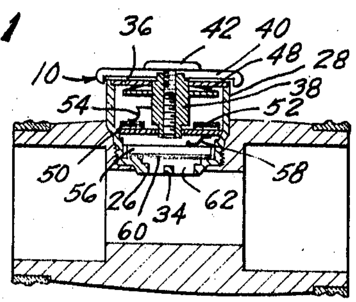
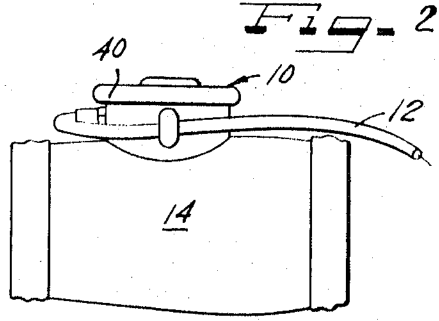
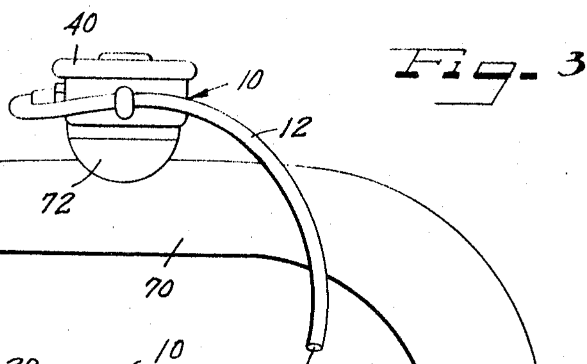
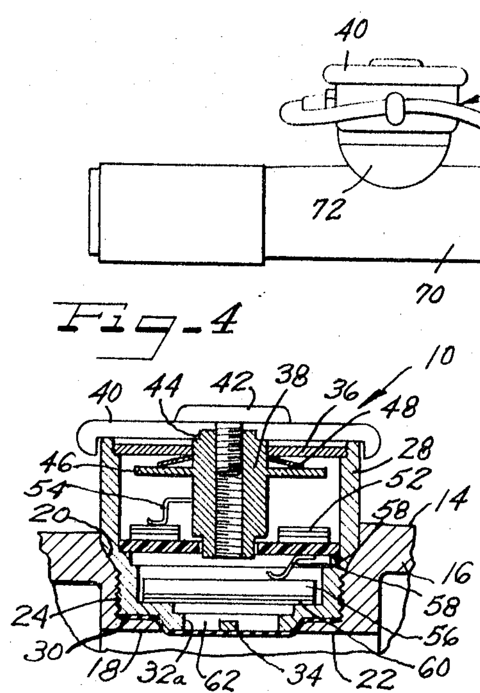
INVENTOR.
JEAN SELMER
BY Hill, Sherman, Meroni, Gross & Simpson ATTORNEYS United States Patent Office 3,457,357
Patented July 22, 1969

3,457,357

SOUND AMPLIFICATION DEVICE FOR WIND INSTRUMENTS

Jean Selmer, Paris, France, assignor to Henri Selmer Et Cie, Paris, France

Filed Oct. 22, 1965, Ser. No. 501,923
Int. Cl. G10d 7/06; G10h 3/00
U.S. Cl. 84—1.04 15 Claims

ABSTRACT OF THE DISCLOSURE

A sound amplification device which may be mounted in the barrel of a wind instrument comprising a housing including a microphone cell and in which a diaphragm is mounted flush with the inner wall of the barrel structure of the instrument so that vibrations of the air in the bore are not disturbed. The diaphragm mounted flush within the bore of the instrument allows vibrations to be transferred to the microphone cell and the instrument may be played with the amplifier connected to the microphone or alternatively without the amplifier.

This invention relates generally to an improved sound pickup device for musical instruments. More particularly, the present invention relates to a novel improvement in the barrel structure of a wind instrument and to a novel sound pickup device for cooperation with the barrel, which improvement allows use of the instrument without the pickup.

The instant invention contemplates either alteration of the barrel of a wind instrument or a novel insert for the barrel of a wind instrument for receiving a sound pickup therein. In either form of the barrel, the wind instrument may be employed with the sound pickup detached therefrom. The present invention also contemplates a sound pickup for use with such an alteration or insert which incorporates a microphone in a sealed cavity thereof with a diaphragm of the cavity in direct connection with the column of air in the bore of the instrument. Therefore, the microphone cell with its diaphragm covering is not directly linked to the column of air and the bore of the instrument, but to a sealed cavity which has transmitted to it and contains the vibrations of the air column in the bore. The sealed chamber, therefore, separates the column of air in the instrument from the microphone membrane.

Many of the sound pickup devices of the prior art require some degree of change in the bore of the instrument. Of course, any change within the bore of the instrument will produce changes in the sound effects due to the interference caused with the air column therein. Such prior are devices may include tubes protruding into the bore of the instrument or cavities offset from the bore which can cause undesirable influences on the air column within the instrument. Furthermore, such prior art sound pickups are not adapted for being positioned in direct contact with the air column of the instrument. As a result, the vibrations within the air column are subjected to attenuation.

Such attenuation of the vibrations from the air column require greater amplification and/or a more sensitive microphone cell within the sound pickup device. Since key noises are transmitted along and through the walls of the instrument and into the sound pickup device, the ratio of the key noise to the vibrations derived from the air column is relatively high. If such attenuation is not realized between the air column and the microphone cell, however, the amplification of the sensed vibrations can be reduced and the key noises will not be as greatly amplified.

Generally, wind instruments which have been adapted to receive a sound pickup element thereon have, heretofore been altered to such a degree that the instrument cannot be used without the sound pickup element attached thereto. That is, since many of the prior art sound pickup elements require a direct air connection with the bore of the instrument, removal of the pickup element from the instrument renders the instrument unusable.

Therefore, it is an object of this invention to provide a sound pickup element which is adapted for direct and immediate connection with the bore of a wind instrument.

Another object of the present invention resides in the provision of connecting structures on a wind instrument for receiving a sound pickup element therein and which allow use of the instrument during removal of the pickup element therefrom.

Yet another object of the present invention resides in the provision of a sealed cavity in a sound pickup device in direct contact with the air column in an instrument of one side thereof and in direct contact with a microphone cell on the other side thereof.

These and other objects, features and advantages will be more fully realized and understood from the following detailed description when taken in conjunction with the accompanying drawing wherein:

FIGURE 1 is a sectional view of a barrel insert with a sound pickup element of the present invention mounted therein;

FIGURE 2 is a side elevational view of the insert and pickup element;

FIGURE 3 is a side elevational view of another embodiment of the present invention shown in combination with the barrel of a clarinet; and FIGURE 4 is a broken out detailed view of the sound pickup element and mounting therefor of FIGURE 1.

Like reference numerals throughout the various views of the drawing are intended to designate the same or similar structures.

With reference to the drawing and in particular to FIGURES 1, 2 and 4, there is shown a sound pickup element, generally designated with the reference numeral 10, having a conductor 12 extending therefrom to suitable amplifying means (not shown). The pickup element 10 is mounted in an insert 14 which forms a part of and is continuous with the barrel of a wind instrument, such as a clarinet, saxophone, and the like. It is to be understood that the sound pickup device 10 may be mounted in an insert such as the insert 14 or may be mounted in a continuous portion of the barrel of a wind instrument.

The barrel insert 14 has a bore 16 extending therethrough which supports a column of air therein during the production of sound by the wind instrument. The bore 16 includes a reduced portion 18 having an aperture 20 therein. The aperture 20 is preferably of larger diameter at the outer surface of the insert 14 and of a substantially lesser diameter at the inner surface of the insert 14 to provide a circumferential shoulder 22. The aperture 20 is provided with threads 24 for receiving the sound pickup 10 therein. A diaphragm 26 is mounted and circumferentially supported on the shoulder 22 and seals the aperture 20 from the air column in the bore 16. The sound pickup element 10 includes a housing 28 conformably shaped to the aperture 20 and threadedly engaged with the threads 24 thereof. The housing 28 includes a bottom wall 30 substantially conformably shaped to the circumferential shoulder 22 and having an opening 32 therein. When the housing 28 is received within the aperture 20, the end wall 30 rests against the diaphragm 26. It is to be understood that the diaphragm 26 may be conformably shaped to the end wall 30 as shown in FIG- URE 4, or may be depressed to that shape by the end wall 30. The housing 28 may include one or more ribs 34 for providing additional support and rigidity to the diaphragm 26. The diaphragm 26 is secured to the circumferential shoulder 22 by an adhesive or other suitable means.

The upper portion of the housing 28 is closed by a disk 36 which threadedly engages the side wall of the housing 28 as shown, or is otherwise secured thereto as by being pressed therein. A shaft 38 extends through a central aperture in the disk 36 and a control button 40 is mounted thereon by means of a screw 42 extending into a central threaded aperture of the shaft 38. The shaft 38 includes a pair of flat surfaces 44 which engage the control button 40, such that the control button 40, when rotated causes rotation of the shaft 38. The shaft 38 includes a circumferential flange 46 extending therefrom and a spring washer 48 is disposed between the flange 46 and the disk 36 for biasing the shaft 38 downwardly into the housing 28. A washer 50 is supported within the housing 28 and carries a resistance element 52 thereon. A wiper 54 is mounted on the shaft 38 and engages the resistance element 52.

Mounted in the lower portion of the housing 28 is a microphone cell 56 which is connected to the resistance element 52 by means of a conductor 58. A diaphragm 60 is disposed between the microphone cell 56 and an inner surface of the end wall 30 and, in combination with the diaphragm 26 provides a sealed airtight chamber as indicated by the reference numeral 62. The sealed cavity 62 provides one of the novel features of the present invention in that better tonal quality is produced in addition to better performance and other factors pertinent to the proper reproduction of sound. Furthermore, as shown in FIGURE 1, the diaphragm 26 is flush with the inner surface of the reduced portion 18 of the bore 16. Therefore, there is neither a protrusion nor an offset cavity for adversely affecting the air column in the bore 16 during the production of sound. It may be readily appreciated that removal of the sound pickup element 10 from the aperture 20 does not disable the instrument, since the diaphragm 26 is fixed to the shoulder 22 and remains thereon for sealing the bore 16 after removal of the sound pickup element 10.

When it is not possible to provide a threaded aperture, such as the aperture 20, in the side wall of the instrument barrel, it becomes necessary to provide additional mounting means for the sound pickup element 10. One such arrangement is illustrated in FIGURE 3 wherein the sound pickup element 10 is shown as being mounted in the barrel of a mouth piece 70 of a saxophone. The wall of the mouth piece 70 may not be of adequate thickness to support threaded engagement of the sound pickup element 10 therein and, therefore, a non-threaded aperture (not shown) is provided, such as the aperture 20 and an internally threaded flange 72 is secured to the mouth piece 70 over the aperture. The flange 72 may be secured to the mouth piece 70 by means of welding, an adhesive, or other suitable means. It is also preferable in the embodiment illustrated in FIGURE 3 to provide a diaphragm, such as the diaphragm 26 of FIGURE 1, across the aperture in the mouth piece 70. Furthermore, it is preferable that this diaphragm be flush with or continuous with the inner surface of the mouth piece 70. With such an arrangement, it is possible to play the instrument during removal of the sound pickup element 10 therefrom.

In summary, it can be readily appreciated that the double diaphragm arrangement described in conjunction with FIGURES 1, 2 and 3 which separate the microphone cell from the air column of the instrument assures a perfect tightness of the sound pickup element 10. Also, the sound pickup element 10 can be easily removed from the instrument and, such removal does not alter the characteristics of the instrument during its use. In addition, control of the amplification is provided by a simple arrangement which does not interfere with the sealed cavity between the microphone cell and the bore of the instrument. It is further to be understood that any manner of fixation of the housing 28 of the sound pickup element 10 to the barrel of the instrument may be employed and that the present invention is not limited to the threaded engagement illustrated.

It will be understood that modifications and variations may be effected without departing from the scope of the novel concepts of the present invention.

I claim as my invention:

1. In a wind instrument having a barrel for supporting a column of air therein during the production of sound, the improvement wherein a portion of said barrel includes an aperture therein for receiving a sound pickup and a diaphragm mounted across the aperture flush with the inner wall of said barrel.

2. The wind instrument as defined in claim 1 wherein said sound pickup comprises:

(a) a housing having walls defining an open end and abutted with the diaphragm at the open end to define an airtight chamber, and (b) a microphone cell mounted in said housing a spaced distance from said diaphragm.

3. The wind instrument as defined in claim 1 wherein said sound pickup comprises:

(a) a housing having walls defining an open end and abutted with the diaphragm at the open end, and (b) a microphone cell mounted in said housing a spaced distance from said diaphragm and forming a closed chamber therebetween.

4. A sound pickup device for musical instruments comprising:

(a) a housing having an open end to be mounted flush with a resonating chamber of an instrument, (b) a microphone cell mounted in said housing a spaced distance from the open end, and (c) a diaphragm covering the open end of said housing and adapted for receiving vibrations from the instrument thereon, said diaphragm cooperating with said housinng to form an airtight chamber.

5. A sound pickup device for musical instruments comprising:

(a) a housing having an open end to be mounted flush with a resonating chamber of an instrument, (b) a microphone cell mounted in said housing a spaced distance from the open end, and (c) a diaphragm covering the open end of said housing and adapted for receiving vibrations from the instrument thereon, said diaphragm and said microphone cell defining an airtight chamber with walls of said housing.

6. In a wind instrument having a barrel portion for the passage of air therethrough during the production of sounds, a portion of the barrel having an aperture therein, a diaphragm extending across said aperture flush with the inner wall of said barrel, and a sound pickup disposed in said aperture, said sound pickup comprising:

(a) a housing having an open wall portion at one end thereof abutting with said diaphragm, and (b) a microphone cell mounted in said housing, said diaphragm providing an airtight chamber within said housing.

7. A sound pickup for a wind instrument comprising:

(a) a housing having an open end and mountable in a resonating chamber of said instrument;

(b) a first diaphragm across the open end of said housing flush with the inner wall of said resonating chamber, (c) a microphone cell in said housing and spaced from said first diaphragm, and (d) a second diaphragm adjacent said microphone cell and forming an airtight chamber with said first diaphragm.

8. In a wind instrument having a barrel supporting a column of air therein during the production of sound, a portion of said barrel including an aperture, a diaphragm across the aperture flush with the inner wall of said aperture, a microphone cell mounted in the aperture a spaced distance from said diaphragm and forming an airtight chamber therewith.

9. In a wind instrument as defined in claim 8 including a second diaphragm in the airtight chamber and adjacent said microphone cell.

10. In a wind instrument having a barrel supporting a column of air therein during the production of sound, a portion of said barrel including an aperture therein, a diaphragm across the aperture and substantially coextensive with an inner surface fo said barrel portion, said diaphragm being continuous with the inner surface of said barrel portion for sealing the column of air from environment external of said barrel.

11. In the wind instrument as defined in claim 10, said barrel portion being of reduced diameter with respect to the remaining barrel.

12. A sound pickup for a musical instrument comprising (a) a cylindrical housing having an open end,
(b) a diaphragm across the open end of said housing,
(c) a microphone cell in said housing,
(d) an impedance member mounted in said housing and in electrical connection with said microphone cell,
(e) a shaft extending through the other end of said housing and rotatably mounted therein, and
(f) a wiper secured to said shaft and engaging said impedance member.

13. A sound pickup for a musical instrument comprising (a) a cylindrical housing having an open end,
(b) a diaphragm across the open end,
(c) a microphone cell in said housing and spaced from said diaphragm and forming an airtight chamber therebetween, and
(d) a potentiometer in said housing having a shaft thereof extending through the other end of said housing.

14. In a wind instrument having a barrel supporting a column of air therein during the production of sound, a portion of said barrel having an aperture therein, a diaphragm across the aperture and flush with the inner wall of said barrel, and means secured to said barrel for receiving a sound pickup in the aperture.

15. A device for insertion between two portions of the barrel of a wind instrument and adapted to receive a sound pickup comprising:

(a) a hollow cylindrical portion including means for engaging respective portions of the barrel and adapted for coaxial alignment with the respective barrel portions,
said cylindrical portion including an aperture in a side wall thereof, and
(b) a diaphragm across the aperture and flush with the hollow cylindrical portion.

References Cited

UNITED STATES PATENTS

| | | | |
|---|---|---|---|
| 1,486,081 | 3/1924 | Fischer | 84—1.04 |
| 2,486,263 | 10/1949 | De Armond | 84—1.15 |
| 2,494,390 | 1/1950 | Johnson | 84—1.04 |
| 2,821,879 | 2/1958 | Sano | 84—1.04 |
| 2,984,140 | 5/1961 | Barron | 84—1.04 |
| 3,144,801 | 8/1964 | Abreo | 84—1.04 |

JOHN S. HEYMAN, Primary Examiner

H. A. DIXON, Assistant Examiner

U.S. Cl. X.R.

84—380